(12) United States Patent
Chassoulier et al.

(10) Patent No.: US 8,032,325 B2
(45) Date of Patent: Oct. 4, 2011

(54) DEVICE FOR SENSING A RADIAL POSITION SPREAD OVER MORE THAN 90 DEGREES

(75) Inventors: Damien Chassoulier, Mouans-Sartoux (FR); Fabrice Champandard, Pegomas (FR); Thierry Dargent, Auribeau/sur/Saigne (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 12/535,819

(22) Filed: Aug. 5, 2009

(65) Prior Publication Data

US 2010/0036640 A1 Feb. 11, 2010

(30) Foreign Application Priority Data

Aug. 5, 2008 (FR) ...................................... 08 04478

(51) Int. Cl.
*G01C 9/00* (2006.01)
*G01B 7/30* (2006.01)
*H02K 1/14* (2006.01)
(52) U.S. Cl. .................. 702/151; 324/207.25; 310/40 R
(58) Field of Classification Search .................. 702/151, 702/33–36, 44, 57, 60, 64–65, 81, 84–85, 702/94–95, 97, 105, 127, 150, 157, 182–183; 324/200, 207.23, 207.25; 310/40 R, 90.5, 310/154.01, 156.01, 156.05; 73/1.75–1.77, 73/1.79, 1.84, 66, 460
See application file for complete search history.

(56) References Cited

U.S. PATENT DOCUMENTS

| | | | | |
|---|---|---|---|---|
| 4,529,934 A | * | 7/1985 | Heinrich | 324/173 |
| 4,692,699 A | * | 9/1987 | Brunet et al. | 324/207.16 |
| 4,891,997 A | * | 1/1990 | Hayashi | 74/5.46 |
| 5,142,175 A | * | 8/1992 | Watanabe | 310/90.5 |
| 5,748,005 A | * | 5/1998 | McCormick et al. | 324/662 |
| 5,763,972 A | * | 6/1998 | Bernus et al. | 310/90.5 |
| 6,351,049 B1 | | 2/2002 | Chassoulier et al. | |
| 6,384,500 B1 | | 5/2002 | Chassoulier et al. | |
| 6,443,398 B2 | | 9/2002 | Dargent et al. | |
| 6,707,200 B2 | * | 3/2004 | Carroll et al. | 310/90.5 |
| 2007/0295885 A1 | | 12/2007 | Vidal | |
| 2009/0126519 A1 | | 5/2009 | Chassoulier | |

FOREIGN PATENT DOCUMENTS

| | | |
|---|---|---|
| DE | 4515381 A1 | 11/1993 |
| EP | 1422492 A | 5/2004 |
| FR | 2630542 | 10/1989 |
| GB | 2105475 A | 3/1983 |
| WO | WO-97/37146 A | 10/1997 |

OTHER PUBLICATIONS

Matsuda et al., Optimal Number of Stator Poles for Compact Active Radial Magnetic Bearings, Aug. 2007, IEEE Transactions on Magnetics, vol. 43, No. 8, pp. 3420-3427.*

* cited by examiner

*Primary Examiner* — Michael Nghiem
*Assistant Examiner* — Toan Le
(74) *Attorney, Agent, or Firm* — Stroock & Stroock & Lavan LLP

(57) ABSTRACT

The invention produces contactless radial position sensors having an equivalent angular aperture greater than 90°, and substantially eliminates the spurious microvibrations due to the imperfections of the current sensors. For this, the invention uses at least four independent sensors and an electronic device capable of virtually placing in series said sensors in groups of two or three in order to spread the equivalent angular aperture of said groups of sensors.

1 Claim, 6 Drawing Sheets

DEVICE FOR SENSING A RADIAL POSITION SPREAD OVER MORE THAN 90 DEGREES

CROSS-REFERENCE TO RELATED APPLICATION

Figure 1:
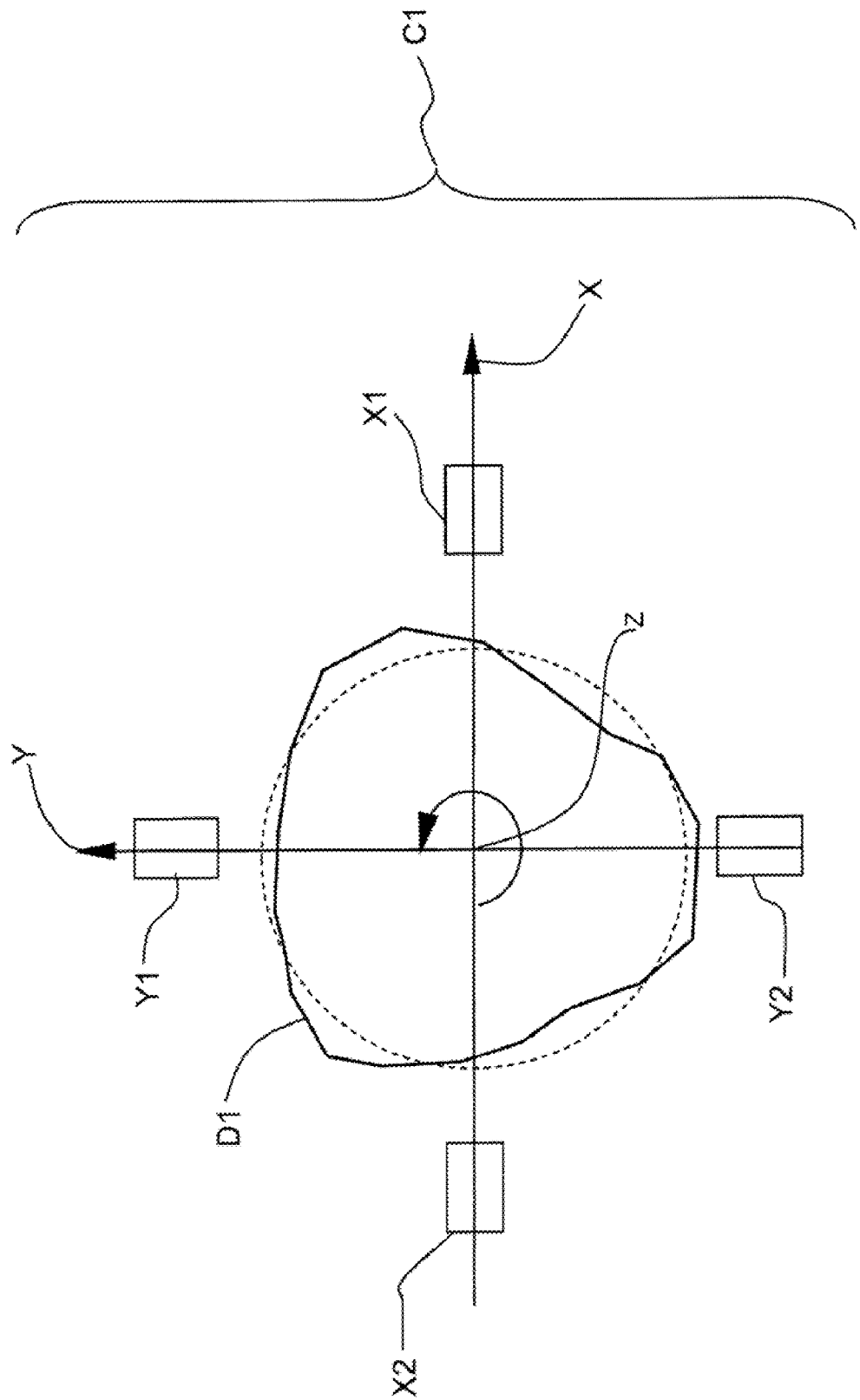

The present application claims the benefit of French Patent Application No. 08 04478, filed Aug. 5, 2008, which is hereby incorporated by reference in its entirety.

FIELD OF THE INVENTION

The present invention relates to a device for measuring the radial position of a rotor relative to a stator in a wheel with magnetic bearings intended for space applications.

More specifically, the invention makes it possible to produce contactless radial position sensors having an equivalent angular aperture greater than 90°, and making it possible to eliminate as far as possible the spurious microvibrations due to the imperfections of the current measurement means, which will be explained hereinbelow.

BACKGROUND OF THE INVENTION

These days, wheels with magnetic bearings intended for space applications in gyroscopic actuators comprise a rotor in levitation about a stator. This levitation is controlled by an electronic servo-control based on a position sensor, an actuator, conventionally a magnetic bearing, making it possible to provoke displacements of the rotor, and an electronic device which controls the actuator according to information given by the position sensor.

The position sensor concerned consists of a set of inductive sensors. It generally comprises a detection ring situated on the stator and a detection track situated on the rotor. The detection track is produced in a conductive material, generally a magnetic. The position sensor makes it possible to know the distance between the detection ring and the detection track.

However, the detection track, generally cylindrical, has defects which may be surface defects, or defects associated with the material itself: resistivity, particle size, etc. These defects cause spurious microvibrations of the rotor, because they are "seen" by the position sensor, and the electronic servo-control leads to multiple rotor displacement commands.

By definition, the defects of the detection track are periodic, since, on each revolution, a defect of the detection track passes once again in front of the same sensor. They can therefore be broken down into Fourier series comprising a fundamental component and harmonics of order 1 to N. The fundamental component is not a property of the detection track but rather a mechanical property of the complete magnetic bearing wheel device. It can be filtered in various ways.

The present invention applies to a context in which it is important to minimize the spurious microvibrations of the rotor.

The solutions that are currently envisaged fall into three categories: improving the detection track in order to minimize its defects; improving the sensor so that it does not "see" the defects of the detection track; filtering the defects using the electronics.

First of all, it is known by coupling two diametrically opposing sensors, the even order harmonics of the spurious vibrations can be eliminated. The position sensors of the state of the art can, for example, comprise four sensors coupled in pairs.

Furthermore, for the sensors to "see" a minimum of defects of the detection track, their angular aperture must be increased: thus, the state of the art has moved on from one-off sensors to sensors having an angular aperture close to 90°. These spread sensors "see" fewer defects, because they measure average values over a wide angle, which makes it possible to eliminate the high-order harmonics. However, too many spurious micro-vibrations remain; they correspond to the low-order harmonics of the Fourier series breakdown of the defects of the detection track.

SUMMARY OF THE INVENTION

The present invention provides a way of largely overcoming this persistent fault. Thus, to obtain a wheel with magnetic bearings subject to a minimum of spurious microvibrations, the invention proposes angularly spreading beyond 90° the aperture of the sensors, to a value making it possible to best smooth the defects of the detection track. This is made possible by the use of at least four electrically independent sensors offset relative to the actuation axes of the wheel with magnetic bearings.

To this end, the subject of the invention is a radial position sensing device intended for wheels with magnetic bearings, comprising:
   a rotor with a detection track,
   a stator with a detection ring,
   said device being associated with a direct orthogonal frame of reference fixed relative to the detection ring and comprising a first actuation axis, a second actuation axis and a rotation axis about which the rotor can revolve, characterized in that it comprises at least four electrically independent sensors, at least one of which is offset relative to the first and second actuation axes, and fixed relative to the detection ring, making it possible to independently measure the positions of the detection track relative to each of the sensors, and to determine by computation the positions of the detection track relative to the detection ring in said direct orthogonal frame of reference.

Advantageously, the inventive device can comprise four sensors, of which a first sensor is offset by approximately 45° in the trigonometrical sense relative to the second actuation axis, and second, third and fourth sensors distributed uniformly in that order, at 90° to one another in the trigonometrical sense, in a plane defined by the first and second actuation axes of the direct orthogonal frame of reference.

Advantageously, each sensor has an angular aperture of between approximately 45° and 90°.

Advantageously, each sensor has an angular aperture of approximately 60°, making it possible to obtain, by coupling said sensors in pairs, an equivalent angular aperture of 120° per pair of sensors.

Advantageously, the inventive device can comprise six sensors, including a first sensor aligned with the second actuation axis and second, third, fourth, fifth and sixth sensors distributed uniformly at 60° to one another in a plane defined by the first and second actuation axes of the direct orthogonal frame of reference.

Advantageously, each sensor has an angular aperture of between approximately 30° and 60°.

Advantageously, the inventive device also comprises an electronic device making it possible to electrically excite the sensors and perform computations based on the measurements performed by each of the sensors, making it possible to determine the position of the detection track relative to the detection ring in the direct orthogonal frame of reference.

Advantageously, a method of determining the radial position of a rotor relative to a stator comprises the use of the inventive device, and comprises the following steps.

initially, the first sensor measures a first voltage linked to the position of the detection track relative to said first sensor, the second sensor measures a second voltage linked to the position of the detection track relative to said second sensor, the third sensor measures a third voltage linked to the position of the detection track relative to said third sensor, the fourth sensor measures a fourth voltage linked to the position of the detection track relative to said fourth sensor, secondly, the computation means calculate, on the one hand, the sum of the third and fourth voltages, from which is subtracted the sum of the first and second voltages, and on the other hand the sum of the first and fourth voltages from which is subtracted the sum of the second and third voltages, making it possible to determine the position of the detection track in the direct orthogonal frame of reference by the computation of coordinates of said detection track according to the first and second actuation axes of said direct orthogonal frame of reference.

BRIEF LIST OF THE DRAWINGS

Figure 2:
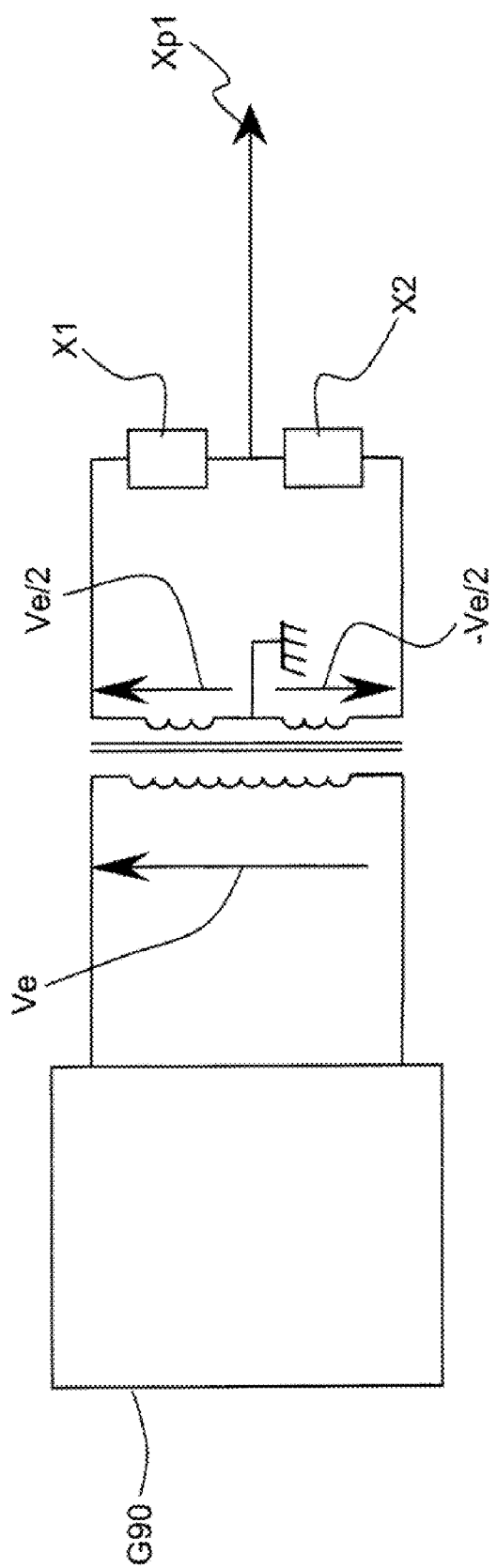
Figure 3:
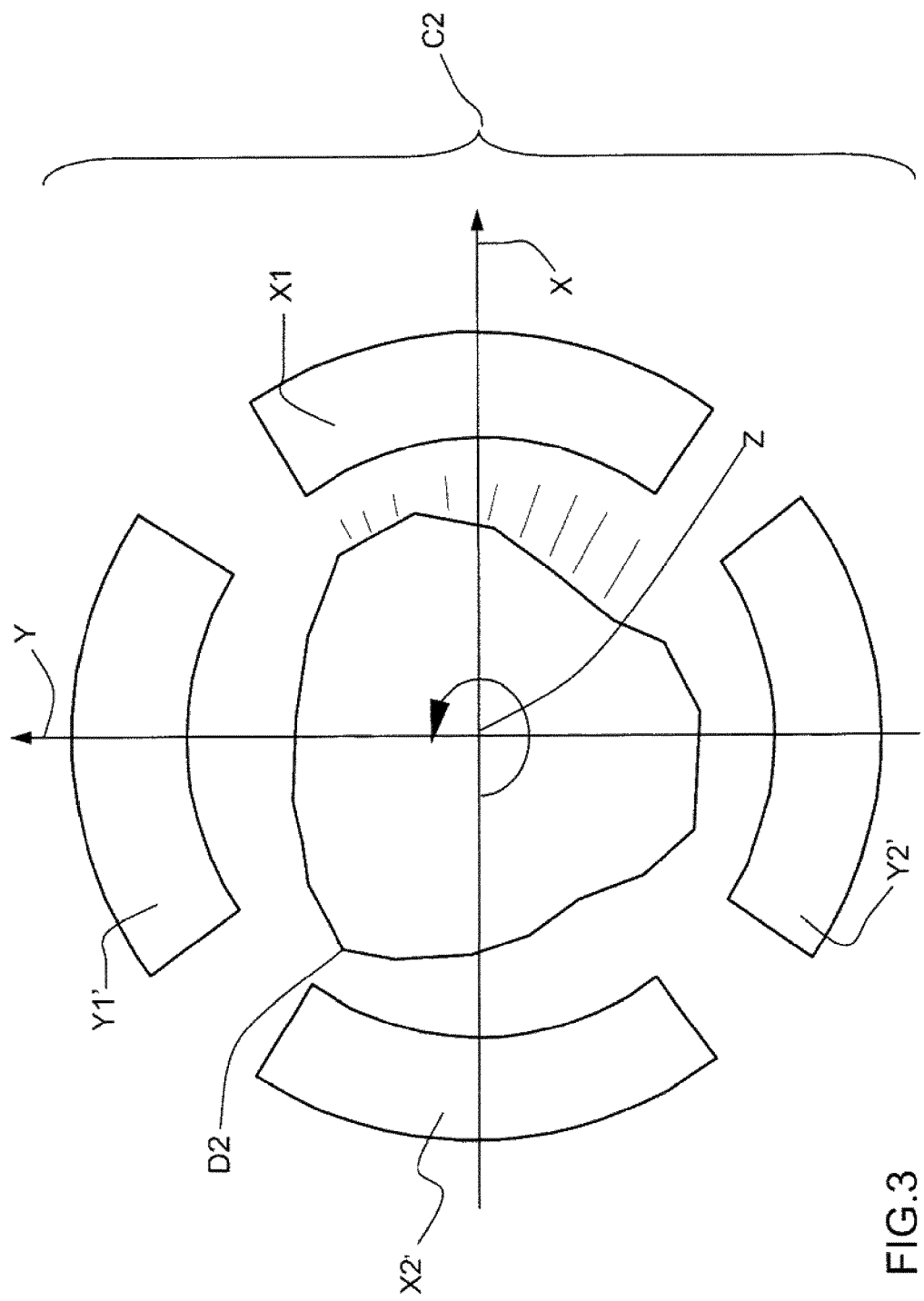
Figure 4:
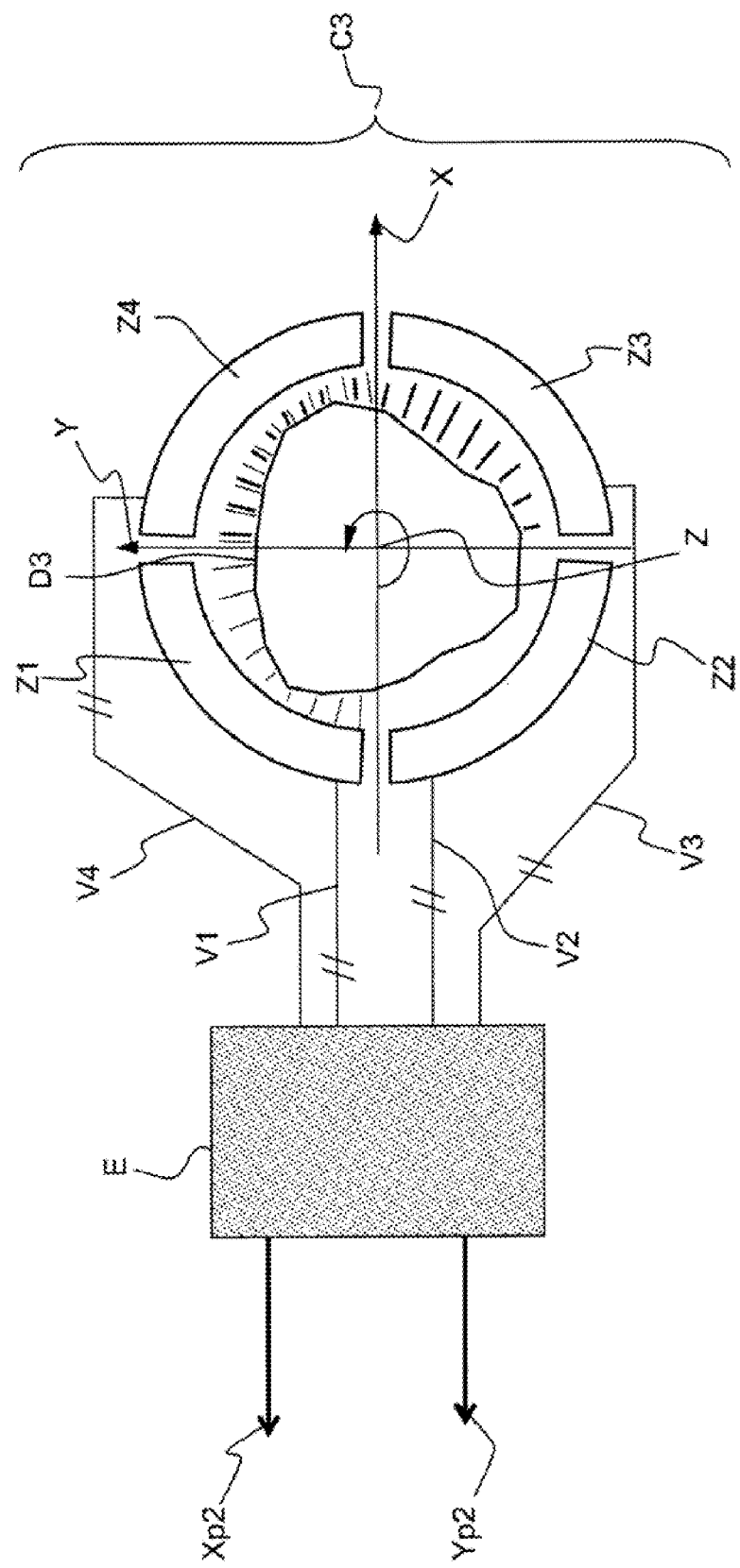
Figure 5:
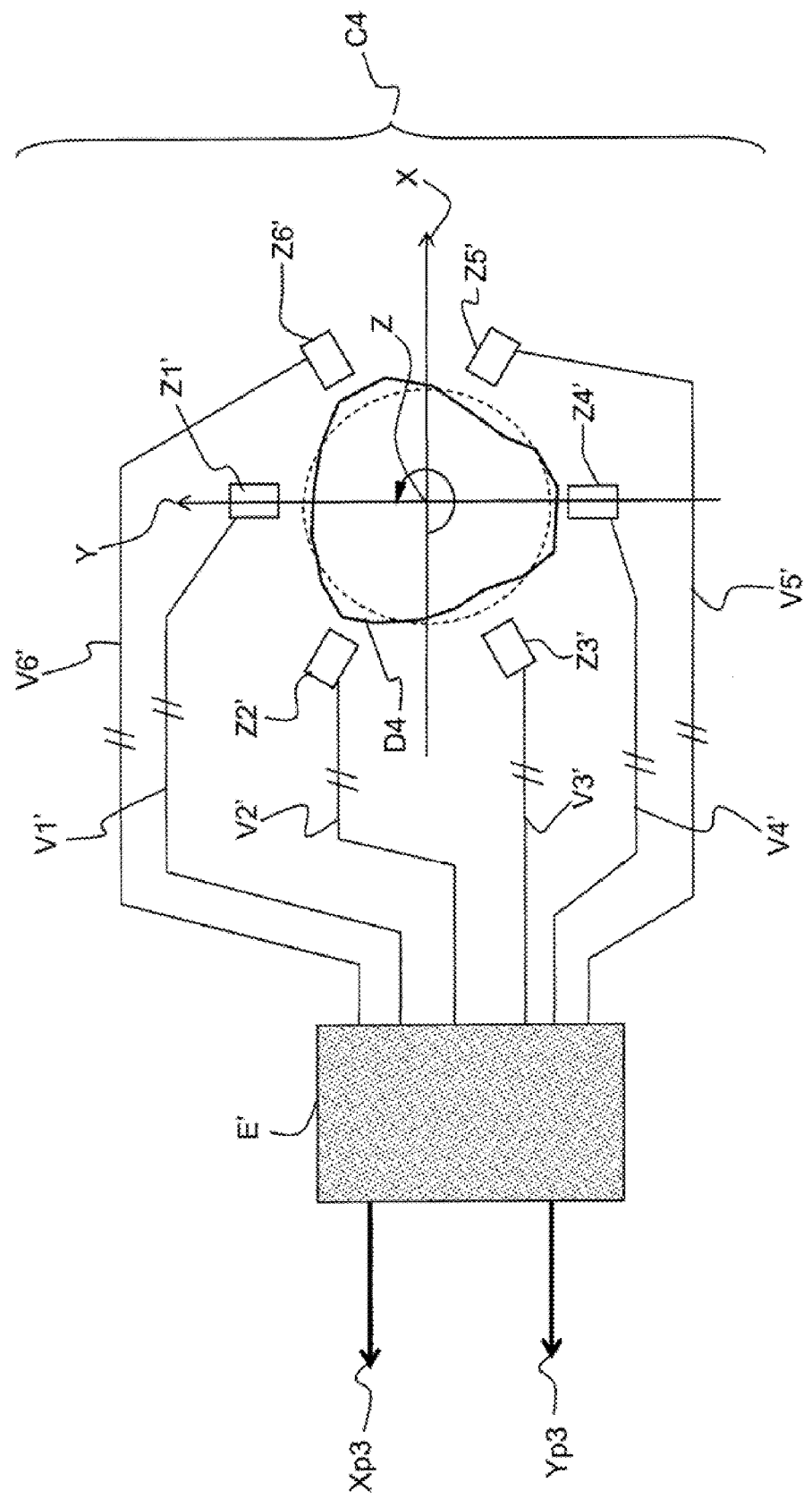
Figure 6:
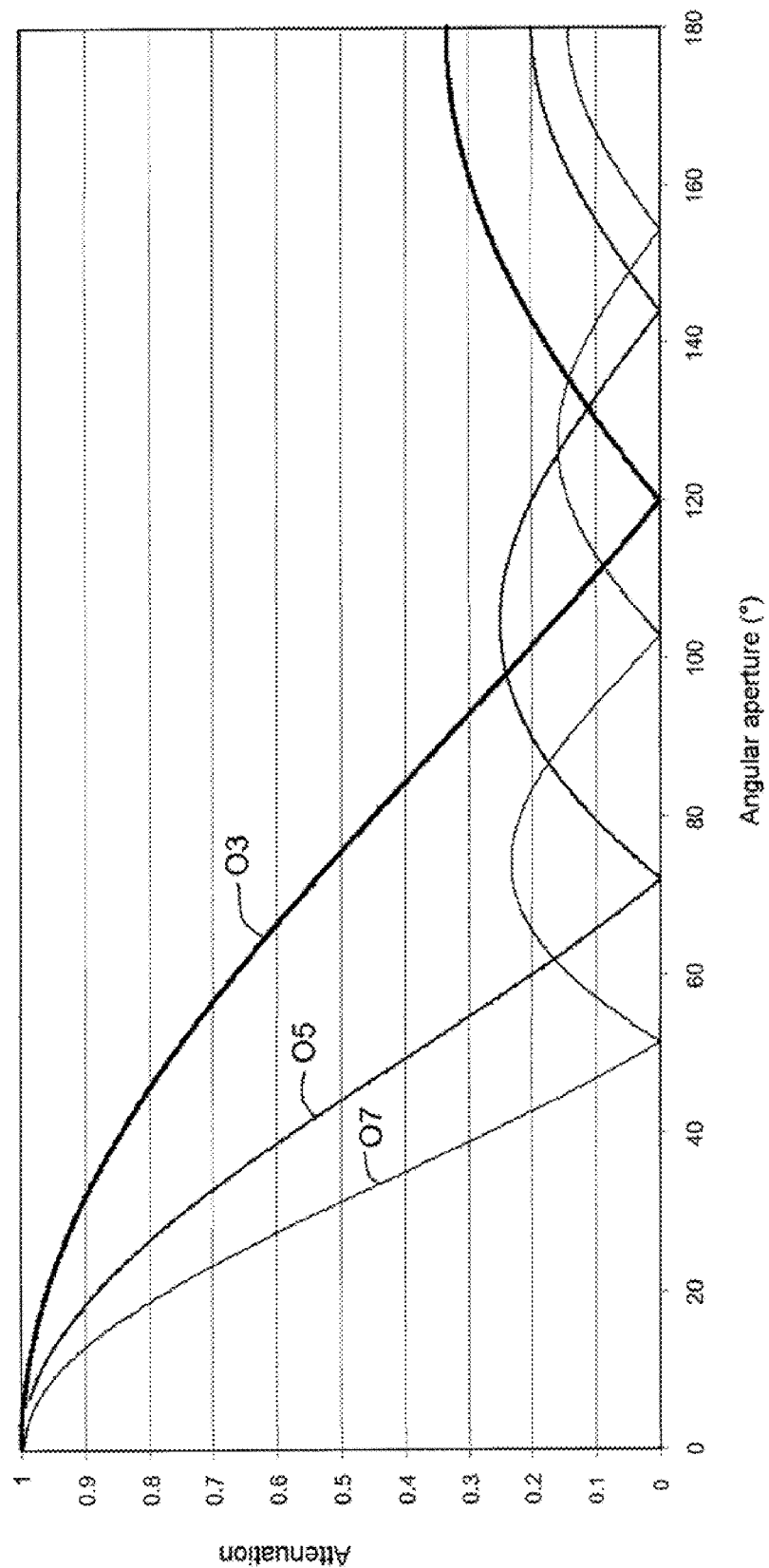

Other features and benefits of the invention will become apparent from the following description, given in light of the appended drawings which represent:

FIG. 1: the diagram of a first example of a radial position sensor according to the state of the art;

FIG. 2: the diagrammatic representation of the bridge-mode electrical configuration of a pair of sensors, as taught in the state of the art;

FIG. 3: the diagram of a second example of a radial position sensor according to the state of the art, provided with sensors with wide angular aperture;

FIG. 4: the diagram of a first example of a radial position sensor according to the invention, comprising four electrically independent sensors;

FIG. 5: the diagram of a second example of a radial position sensor according to the invention, comprising six electrically independent sensors;

FIG. 6: the curve of the attenuation of the harmonics of order 3, 5 and 7 of the spurious microvibrations as a function of the angular aperture of the radial position sensors.

DETAILED DESCRIPTION OF THE INVENTION

FIG. 1 shows a diagram of a position sensor according to the state of the art. The latter comprises four one-off sensors coupled in pairs X1, X2 and Y1, Y2. This position sensor can be compared to the device described in the French Patent FR 2630542, of which it can be considered to represent an exemplary application. The radial position sensor shown in FIG. 1 can be associated with a wheel with magnetic bearings including a rotor with a detection track D1 and a stator on which there is a detection ring provided with one-off sensors X1, X2 and Y1, Y2 coupled in pairs of diametrically opposite sensors. The stator and the set of one-off sensors X1, X2, Y1, Y2 are associated with a direct orthogonal frame of reference that is fixed relative to them. This direct orthogonal frame of reference comprises first and second actuation axes X and Y and the rotation axis Z about which the rotor can revolve. A first pair of sensors, X1 and X2, is situated on the first actuation axis X, and a second pair of sensors, Y1 and Y2, is situated on the second actuation axis Y. The coupling in pairs of the sensors, X1 and X2 on the one hand, Y1 and Y2 on the other hand, is realized by a bridged electrical wiring of each pair of sensors, as explained in FIG. 2. The value measured by the pair of sensors X1, X2 makes it possible to determine the position of the detection track D1 relative to the first actuation axis X, whereas the pair of sensors Y1, Y2 makes it possible to determine the position of the detection track D1 relative to the second actuation axis Y. According to the measured position of the detection track D1 in the direct orthogonal frame of reference X, Y, Z, the device uses magnetic bearings to command relative displacements of the rotor relative to the stator.

As explained previously, these one-off sensors X1, X2, Y1, Y2 "see" defects of the detection track D1 which is not a perfect cylinder. Since the sensors X1, X2, Y1, Y2 are coupled in pairs of diametrically opposite sensors, only the even order harmonics of the Fourier series breakdown of the defects of the detection track D1 are cancelled out. The device thus perceives displacements of the rotor to be compensated and commands microdisplacements of the latter. This induces spurious microvibrations.

FIG. 2 diagrammatically represents how a pair of sensors X1, X2 as described in FIG. 1 can be electrically wired in bridge mode. The generator G90 supplies a voltage Ve at a frequency that is conventionally between 50 kHz and 100 kHz; in the example of FIG. 2, this frequency is 90 kHz. A voltage divider is used to bring a voltage $$\frac{Ve}{2}$$

to the terminals of the sensor X1 and $$-\frac{Ve}{2}$$

to the terminals of the sensor X2. At the point Xp1, a voltage is measured which makes it possible to determine the position of the detection track D1 relative to the first actuation axis X.

FIG. 3 illustrates a known technology that can be used to limit the spurious microvibrations of the rotor of a wheel with magnetic bearings. This comprises four sensors X1', X2', Y1', Y2' with spread angular aperture. As for the device of FIG. 1, the four sensors are coupled in pairs of diametrically opposite sensors: X1', X2' on the one hand and Y1', Y2' on the other hand. Similarly, each pair of sensors is wired in bridge mode; using the same principle as previously, the value measured by the pair of sensors X1', X2' makes it possible to determine the position of the detection track D2 relative to the first actuation axis X whereas the pair of sensors Y1', Y2' makes it possible to determine the position of the detection track D2 relative to the second actuation axis Y. According to the measured position of the detection track D2 in the direct orthogonal frame of reference X, Y, Z, the device uses magnetic bearings to command relative displacements of the rotor relative to the stator. Again as for the device of FIG. 1, the coupling in pairs of diametrically opposite sensors X1', X2' and Y1', Y2' makes it possible to eliminate the even order harmonics of the Fourier series breakdown of the defects of the detection track D2. The difference therefore lies in the spread angular aperture of each of the sensors X1', X2', Y1' and Y2'. This angular aperture can reach approximately 90°. Consequently, the sensors "see" only the average of the defects of the detection track D2 over an angle of approximately 90°, corresponding to their angular aperture. Because of this, the device "sees" fewer defects and there are therefore fewer microvibrations.

However, microvibrations still persist and the object of the invention is to further reduce them.

FIG. 4 represents a first exemplary embodiment of the invention. As in the state of the art described in FIG. 3, this inventive device comprises four sensors Z1, Z2, Z3, Z4, the angular aperture of which can be close to 90°, distributed uniformly, the four sensors Z1, Z2, Z3, Z4 being diametrically opposite in pairs. On the other hand, contrary to the teachings in the state of the art, the four sensors Z1, Z2, Z3, Z4 of the inventive device shown in FIG. 4 are independent of one another. They are electrically wired independently. Thus, the sensor Z1 measures a voltage V1 making it possible to determine the position of the detection track D3 relative to said sensor Z1. The same goes for each of the other sensors Z2, Z3, Z4 which respectively measure voltages V2, V3 and V4 making it possible to determine the position of the detection track D3 respectively relative to Z2, Z3 and Z4. Moreover, the sensors Z1, Z2, Z3, Z4 are not aligned with the first and second actuation axes X and Y, contrary to the practice in the state of the art. In the example of FIG. 4, the sensors are offset by approximately 45° relative to said actuation axes X and Y. It will be recalled here that said first and second actuation axes X and Y always form with the rotation axis Z a direct orthogonal frame of reference that is fixed relative to the stator and to the sensors Z1, Z2, Z3, Z4.

The inventive device shown in FIG. 4 also comprises an electronic device E. This electronic device E is used to electrically excite each sensor and determine by computation the coordinates of the detection track D3 in the direct orthogonal frame of reference formed by the first and second actuation axes X and Y. The position of the detection track relative to the first actuation axis X is deduced from the calculation of $Xp2=(V1+V4)-(V2+V3)$ and the position of the detection track relative to the second actuation axis Y is deduced by calculating $Yp2=(V3+V4)-(V1+V2)$. Thus, thanks to these simple calculations performed by the electronic device E, the sensors are artificially placed in series in pairs. To determine Xp2, the sensors Z1 and Z4 on the one hand and the sensors Z2 and Z3 on the other hand are thus "placed in series". To determine Yp2, it is Z1 and Z2 on the one hand and Z3 and Z4 on the other hand that are "placed in series". In this way, each pair of sensors "placed in series" presents an angular aperture that is virtually spread to close to 180°, or twice the angular aperture of a single sensor. Furthermore, as explained previously, the paired combination of diametrically opposite sensors makes it possible to cancel all the even order harmonics of the Fourier series breakdown of the defects of the detection track D3. If each independent sensor has an angular aperture of 60°, this principle makes it possible to have a theoretical angular aperture of 120° for each pair of sensors "placed in series". The spreading to more than 90° of the equivalent angular aperture of the inventive position measuring device makes it possible to smooth the defects of the detection track D3 more than is possible in the state of the art. Consequently, the spurious microvibrations of the wheel with magnetic bearings supporting this device are further reduced.

FIG. 5 shows another exemplary implementation of the invention. The principle is the same as that described in FIG. 4, but with six independent sensors Z1', Z2', Z3', Z4', Z5', Z6'. The electronic device E' can combine these sensors in groups of two or three. Thus, it is possible to eliminate, de facto, all the even order harmonics and all the harmonics that are of an order that is a multiple of three from the Fourier series breakdown of the defects of the detection track D4. Then, according to the same principle as for the device of FIG. 4, the electronic device E' can be used to calculate the position of the detection track D4 relative to the first actuation axis X and relative to the second actuation axis Y. For this, the electronic device E' can virtually place in series two or three sensors and thus multiply by two or three the equivalent angular aperture of the device for measuring the radial position of the rotor relative to the stator in a wheel with magnetic bearings.

The six sensors Z1', Z2', Z3', Z4', Z5', Z6' are in this case also distributed uniformly, at 60° to one another. They can have an angular aperture ranging up to nearly 60°.

FIG. 6 shows a graph demonstrating that there is a link between the angular aperture of the inductive sensors incorporated in the measurement device according to the invention and the attenuation of the low-order harmonics of the Fourier series breakdown of the defects of the detection track D3 or D4. It can be seen from this graph that, to maximize the attenuation of the most annoying residual harmonics, namely the harmonics of order 3, 5 and 7, respectively denoted O3, O5 and O7 in FIG. 6, from the Fourier series breakdown of the devices of the detection track D3 or D4, the optimum equivalent angular aperture of the sensors Z1 to Z4 or Z1' to Z6' lies between 100° and 150°.

To sum up, the main benefit offered by the invention is that it makes it possible to cancel a large proportion of the spurious microvibrations that affect the current wheels with magnetic bearings. For this, the invention proposes to use at least four independent sensors and an electronic device capable of virtually placing in series said sensors in groups of two or three in order to spread to more than 90° the equivalent angular aperture of said groups of sensors.

The invention claimed is:

1. A method of determining the radial position of a rotor relative to a stator, comprising the steps of:

measuring, by a first sensor, a first voltage linked to a position of a detection track relative to said first sensor;

measuring, by a second sensor, a second voltage linked to the position of the detection track relative to said second sensor;

measuring, by a third sensor, a third voltage linked to the position of the detection track relative to said third sensor;

measuring, by a fourth sensor, a fourth voltage linked to the position of the detection track relative to said fourth sensor;

calculating $V3+V4-V1-V2$ to determine the position of the detection track relative to the first actuation axis;

calculating $V1+V4-V2-V3$ to determine the position of the detection track relative to the second actuation axis, wherein:

V1 is the first voltage;
V2 is the second voltage;
V3 is the third voltage;
V4 is the fourth voltage; and
the position of the detection track relative to the first and second actuation axes is an indication of the radial position of the rotor relative to the stator.

* * * * *